United States Patent [19]
Nomura et al.

[11] Patent Number: 5,124,971
[45] Date of Patent: Jun. 23, 1992

[54] OPTICAL HEAD DRIVING DEVICE

[75] Inventors: Tadashi Nomura; Masaaki Seino, both of Tokyo, Japan

[73] Assignee: NEC Corporation, Tokyo, Japan

[21] Appl. No.: 378,936

[22] Filed: Jul. 12, 1989

[30] Foreign Application Priority Data

Jul. 12, 1988 [JP] Japan ............... 63-174719
Jul. 26, 1988 [JP] Japan ............... 63-186504

[51] Int. Cl.⁵ .................. G11B 7/12; H02K 41/02
[52] U.S. Cl. ................... 369/215; 369/219; 360/105; 360/106
[58] Field of Search .......... 369/44.11–44.32, 369/110, 112, 106, 219, 221, 224, 225, 215, 249, 43; 360/73.09, 75, 77.03, 77.07, 77.08, 78.12, 78.13, 99.02, 99.03, 99.06, 99.07, 99.08, 103, 104, 105, 106, 114

[56] References Cited

U.S. PATENT DOCUMENTS

| | | | |
|---|---|---|---|
| 3,721,967 | 3/1973 | Englert et al. | 360/106 |
| 3,735,163 | 5/1973 | Dijkstra et al. | 360/106 X |
| 3,838,455 | 9/1974 | Barnard | 360/106 X |
| 3,922,720 | 11/1975 | Caletti et al. | 360/106 |
| 4,393,425 | 7/1983 | Wright | 360/106 X |
| 4,414,594 | 11/1983 | Farmer et al. | 360/106 |
| 4,415,941 | 11/1983 | Gibeau et al. | 360/106 |
| 4,613,962 | 9/1986 | Inoue et al. | 369/219 X |
| 4,703,470 | 10/1987 | Castagna et al. | 369/215 |
| 4,740,946 | 4/1988 | Yumura et al. | 360/219 |
| 4,745,503 | 5/1988 | Muraoka et al. | 360/106 |
| 4,791,508 | 12/1988 | Augeri et al. | 360/105 X |
| 4,812,934 | 3/1989 | Suzuki et al. | 360/106 |
| 4,819,109 | 4/1989 | Okada et al. | 360/106 |
| 4,868,432 | 9/1989 | Frandsen | 360/106 X |
| 4,982,299 | 1/1991 | Taniguchi et al. | 360/105 |
| 4,996,618 | 2/1991 | Kakuda | 360/105 X |

Primary Examiner—Paul Ip
Attorney, Agent, or Firm—Sughrue, Mion, Zinn, Macpeak & Seas

[57] ABSTRACT

An optical head driving device mounted on a base is comprised of a spindle for driving a recording medium of disk shape, an optical head and a voice coil motor for driving the optical head. The optical head and the voice coil motor are disposed in corresponding positions with respect to the spindle interposed therebetween and are coupled to each other through a torque transmitting arm.

14 Claims, 7 Drawing Sheets

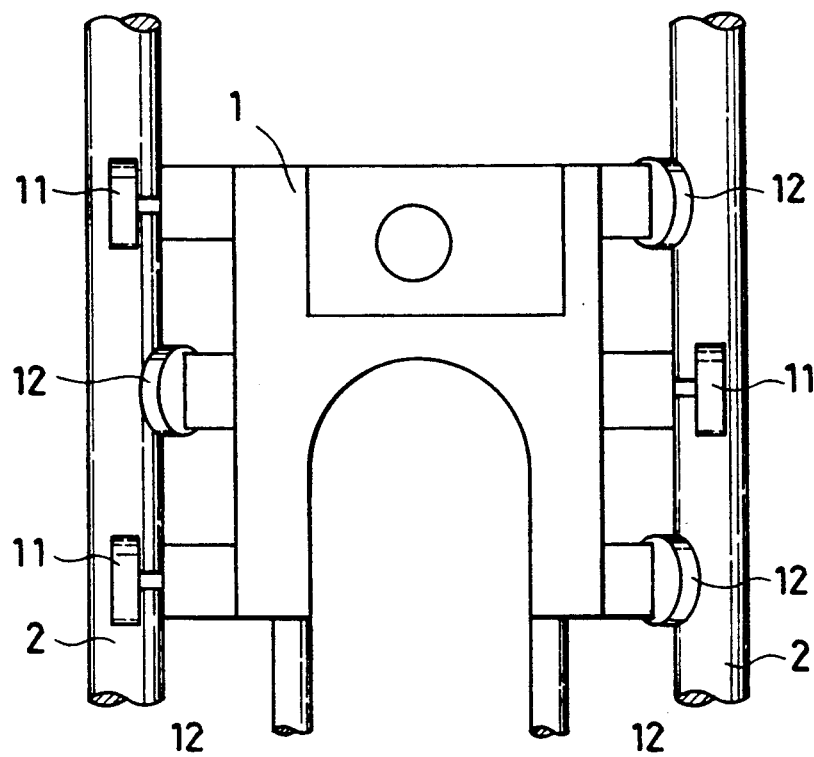
FIG.3
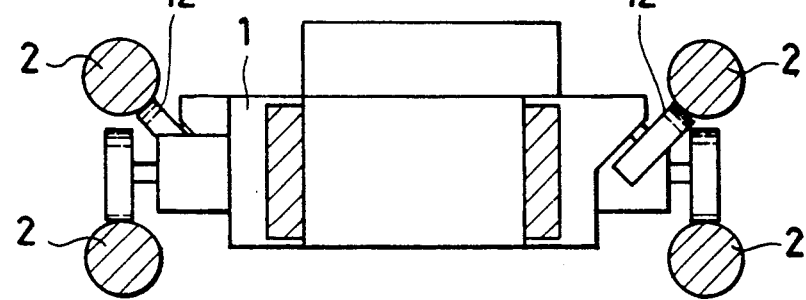
FIG.4
FIG.5
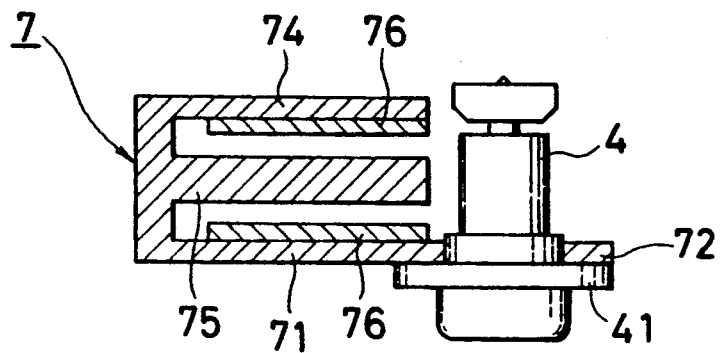

OPTICAL HEAD DRIVING DEVICE

BACKGROUND OF THE INVENTION

The present invention relates to optical head driving device, and more specifically relates to particular optical head driving device of the type in which information is recorded onto a surface of recording medium disk by optical means, and recorded information is read out or erased. Further, the present invention relates to particular optical head driving device in which an optical head is driven by a voice coil motor in an optical disk apparatus operative to record information on a face of recording medium disk by optical means and to read out or erase the recorded information.

Generally, the optical disk apparatus has a spindle for mounting and rotating a recording medium of circular or disk shape (optical disk), and an optical head operative to record binary information sequentially along recording tracks formed substantially concentrically on the recording medium surface while rotating the recording medium by the spindle. Readout and erase of the recorded information are effected sequentially by the optical head while rotating the optical disk in similar manner. The optical head is driven in the radius direction relative to the optical disk by means of a driving device. By such construction, recording, reading out and erasing of information are carried out over the entire face of optical disk.

Such type of the optical disk apparatuses includes one type for especially carrying out high speed information processing which has an optical head driving unit comprised of a voice coil motor provided with a driving coil, in a fixed magnetic circuit, connected to the optical head. This type of the high speed optical disk apparatus can drive (access) the optical head at far faster than that utilizing other driving unit such as stepping motor.

Conventionally, in this type of the optical head driving unit of optical disk apparatus having the voice coil motor as driving source, the driving unit is disposed at one side of the optical head with respect to the moving direction of the optical head, or disposed oppositely to the spindle. Further, the spindle and the fixed magnetic circuit of the voice coil motor are mounted independently of each other on a base plate.

However, in the above described conventional optical head driving device in which the driving unit is disposed at one side of the optical head, since the direction of driving force must coincide with the moving direction of the optical head, the action point of the driving force is not coincident with the center of gravity of the movable optical head, thereby causing drawback that unnecessary vibration is generated during the driving. In order to eliminate such drawback, the driving unit may be disposed on both sides of the optical head so as to balance the driving force. However, it is quite difficult to maintain the balance in vast number of individual optical disk apparatuses without fluctuation of balance. Moreover, the driving force is transmitted to the optical head through a kind of beam structure perpendicular to the action direction thereof, hence there is caused another drawback that sufficiently high driving performance and high tracking performance cannot be obtained. Further, such structure is complicated, thereby causing additional drawback such as low productivity and high cost.

On the other hand, in the optical head driving device of the type in which the driving unit is disposed in opposed relation to the spindle with respect to the optical head (U.S. Pat. No. 4,190,860), the structure is simple and the driving force is efficiently transmitted. However, the driving unit has an elongated shape protruding considerably out of the periphery of the optical disk in the moving direction of the optical head, hence it has drawback that the entire length of the optical head driving device is extended. Further, in such structure, the spindle, optical head, guide member for movement of the optical head and driving unit are aligned linearly in series such that the spindle and the driving unit are fixed on the base in farmost positions separated from each other. Accordingly, in order to suppress unnecessary resonance, sufficiently high rigidity is needed for the base. However, a small size of the apparatus cannot use highly rigid base due to lack of space, thereby causing drawback that the spindle is vibrated relative to the optical head.

SUMMARY OF THE INVENTION

In order to remove the above mentioned drawbacks of the conventional optical head driving device, an object of the present invention is to, therefore, provide an improved optical head driving device in which the structure of optical head and driving unit is simplified and reduced in shape, and good characteristics can be obtained, such as improved anti-vibration characteristic.

The above object of the present invention is achieved by the optical head driving device constructed such that a spindle for driving a recording medium disk, an optical head and a voice coil motor for driving the optical head are provided on a base, and the optical head and voice coil motor are disposed in corresponding or opposed positions with respect to the spindle and are coupled to each other through a force transmitting arm.

In the present invention, a guide rail is provided on the base in the tracking direction, i.e., in the moving direction of the optical head such that the optical head is supported on the base movably in the tracking direction through the guide rail so that the optical head is driven firmly in the given direction.

According to the present invention, the optical head and the voice coil motor for driving the optical head are disposed in opposed relation relative to the intermediate spindle, and the optical head is coupled at its sideface opposed to the spindle to the coil of the voice coil motor through the force transmitting arm such that the action point of driving force to the optical head and action direction thereof are made coincident to the center of gravity and to its moving direction, respectively, and that the driving force of the voice coil motor is transmitted to the optical head through the force transmitting arm.

Further, according to the present invention, the voice coil motor is disposed at one side of the spindle and the voice coil motor which generates driving force of the optical head is disposed a close distance to the spindle, thereby enabling to suppress vibration of the spindle relative to the optical head.

Further, in the present invention, the moving zone of the coil of the voice coil motor is set coincident with that of the optical head such that the voice coil motor can be mostly disposed on the base surface zone within the outer periphery of the recording medium disk or cartridge thereof.

Further, the object of the present invention is achieved by the optical head driving device characterized by having a spindle for mounting on its top face a recording medium disk to rotate the same, a side yoke having an extending portion for supporting a bottom portion of the spindle, a magnetic circuit disposed at one side of the spindle and held through the side yoke fixed to the base, a coil disposed and inserted into a cavity of the magnetic circuit, an optical head disposed on opposite side of the coil with respect to the spindle and engaged with a guide rail disposed on the base in parallel to the recording medium disk for carrying out recording, reading out or erasing of information with respect to the recording medium disk, and the force transmitting arm for supporting and fixing, at its both ends, the coil and the optical head.

According to the above invention, since the spindle is directly fixed to the magnetic circuit of the voice coil motor, the vibration of spindle is suppressed relative to the optical head so as to obtain good anti-vibration performance.

Further, the object of the present invention is achieved by the optical head driving device characterized by having a spindle for mounting at its top face a recording medium of disk shape to rotate the same, a magnetic circuit including a side yoke disposed side of said spindle, fixed to a base and having an extension portion thereof for supporting a bottom portion of said spindle, a coil disposed and inserted into a gap of said magnetic circuit; an optical head provided on a side of said spindle in opposed relation to said coil with respect to said spindle and engaged with a guide rail disposed on said base in parallel to said recording medium of disk shape for carrying out recording, reading out or erasing of information with respect to said recording medium of disk shape, and a force transmitting arm for fixing and supporting, at its opposite end portions, said coil and said optical head wherein the base includes opposed vertical portions to which four guide rails are fixed in pairs on both sides of the optical head which has rollers with horizontal axes of rotation and rollers with inclined axes of rotation being downwardly oriented, rollers with horizontal axes of rotation and rollers with inclined axes of rotation are provided alternately around the optical head, the rollers with horizontal axes of rotation are in contact with the upper surface of the lower guide rails between the guide rails paired, whereas the rollers with inclined axes of rotation are in contact with the lower oblique surface of the upper guide rails.

According to the present invention, since two of the rollers with horizontal axes of rotation and two of the rollers with the inclined axes of rotation are provided at four corners of the optical head and the remaining one roller with horizontal axis of rotation and the remaining one roller with the inclined axis of rotation are provided between the above two rollers with the inclined axes of rotation and between the above two rollers with horizontal axes of rotation, respectively, the optical head can be stably and smoothly moved along the guide rails.

BRIEF DESCRIPTION OF THE DRAWINGS

FIG. 3 is a partial top view showing the engagement of guide rails with rollers of an optical head;

FIG. 4 is a partial vertical sectional view showing the engagement of the guide rails with rollers of the optical head;

FIG. 5 is a side view showing the connection between a spindle and a magnetic circuit, a part of the magnetic circuit being cut away;

DETAILED DESCRIPTION OF PREFERRED EMBODIMENTS

Next, embodiments of the present invention are described with reference to the drawings.

Figure 1:
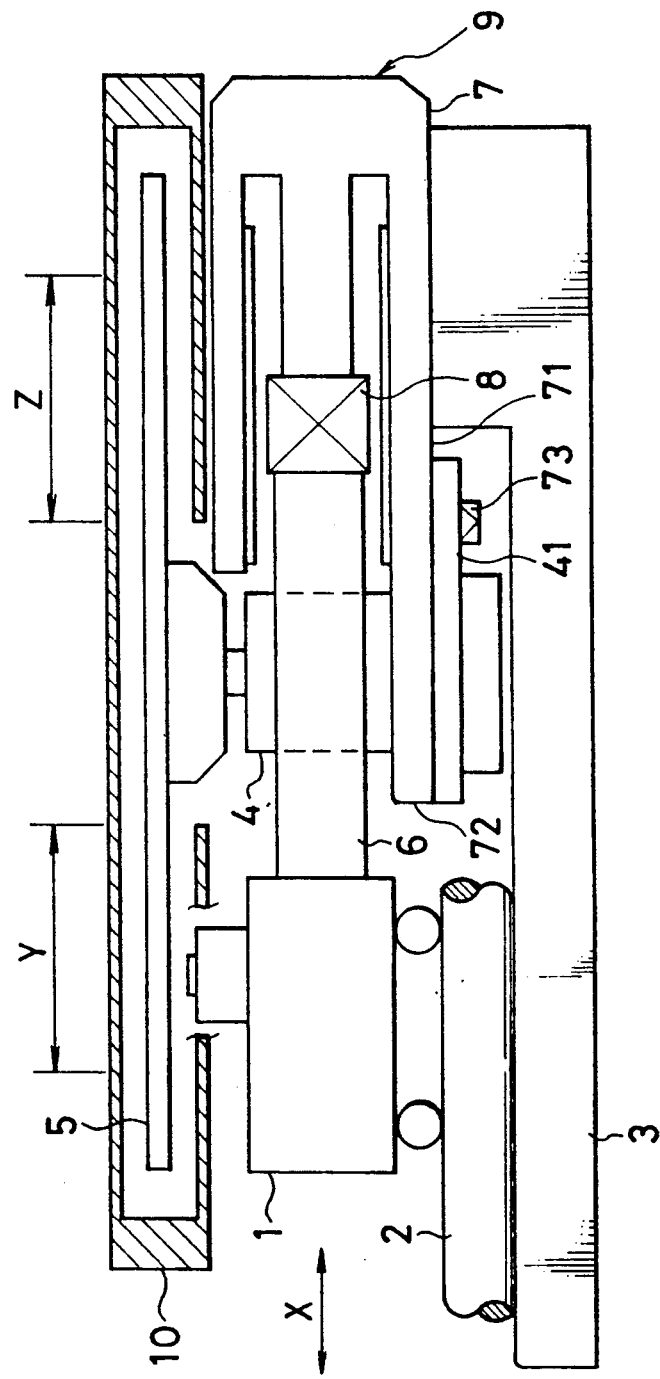
FIG. 1 is a schematic side view containing a part of section, showing one embodiment of the present invention.
Figure 2:
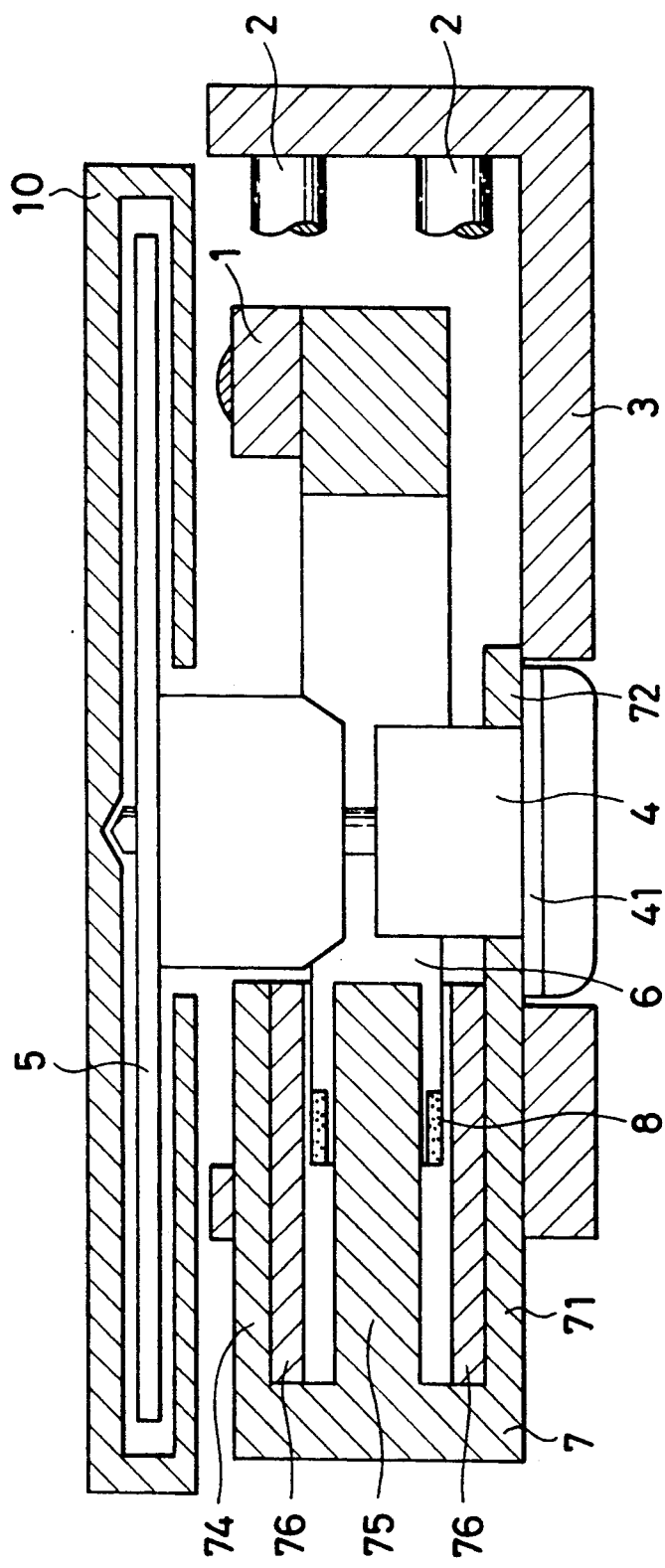
FIG. 2 is a side view containing a part of section, showing an another embodiment of the present invention.

FIG. 1 shows one embodiment of the present invention.

Referring to FIG. 1, an optical head 1 is movable along a guide rail 2 provided on the base 3 in the direction indicated by arrow X in the figure (tracking direction), and displaceable in parallel to the under face of the optical disk 5 mounted on the spindle 4 so as to carry out recording, reading out and erasing of information with respect to recording face of the optical disk 5. The optical head 1 is connected with an end of a force transmitting arm 6, and an opposed end of the force transmitting arm 6 relative to the spindle 4 supports a coil 8 inserted into a gap portion of the magnetic circuit 7 which is fixed on the base 3. The force transmitting arm 6 is driven by force generated by a voice coil motor comprised of the magnetic circuit 7 and the coil 8.

The spindle 4 is supported by the magnetic circuit 7. Namely, the magnetic circuit 7 of the voice coil motor 9 has a side yoke 71 and a side yoke extending portion 72. The spindle 4 is fixed at its flange formed on the bottom thereof to the side yoke 71 and to the side yoke extending portion 72 by means of screwing of plural screws 73. By fixing the spindle 4 through the side yoke 71, the spindle 4 and the voice coil motor 9 are arranged closely to each other and the thickness of the device can be reduced in the direction perpendicular to the surface of optical disk 5. Further, since the side yoke 71 is composed of iron material, the spindle 4 can be fixed with high rigidity under the inventive structure in which the spindle is fixed to the side yoke 71 and the side yoke 71 is fixed to the base 3, as compared to another structure in which the spindle is fixed within a limited space on the base 3 formed by aluminium material. In addition, the optical disk 5 is stored within the cartridge 10 for mounting thereon on the spindle 4.

By such construction as described above, the driving force of the voice coil motor 9 can act on the center of gravity of the optical head 1 in vast number of individual optical disk apparatuses without fluctuation or deviation, and can be generated in the direction coincident to the tracking or moving direction. The transmission of driving force is effected to the optical head 1 through the force transmitting arm 6 which has column structure aligned in the action direction.

The optical head 1 travels within a predetermined zone less than radius of the optical disk 5 as indicated by distance Y in the figure. The coil 8 also requires the same travelling distance, hence a given travelling zone is set as indicated by distance Z in the figure for the coil 8 such that the voice coil motor 9 is constructed mostly within the outer periphery of the optical disk 5 or the cartridge 10 thereof. Accordingly, the optical head 1, spindle 4 and voice coil motor are all mostly arranged within the outer periphery of the optical disk 5 or the cartridge 10 thereof.

Further, since the spindle 4 is directly attached to the voice coil motor which generates the driving force and therefore the distance is very short therebetween both of the spindle and motor are coupled to each other with considerably high ridigity, thereby suppressing the vibration of spindle 4 relative to the optical head 1.

Figure 6:
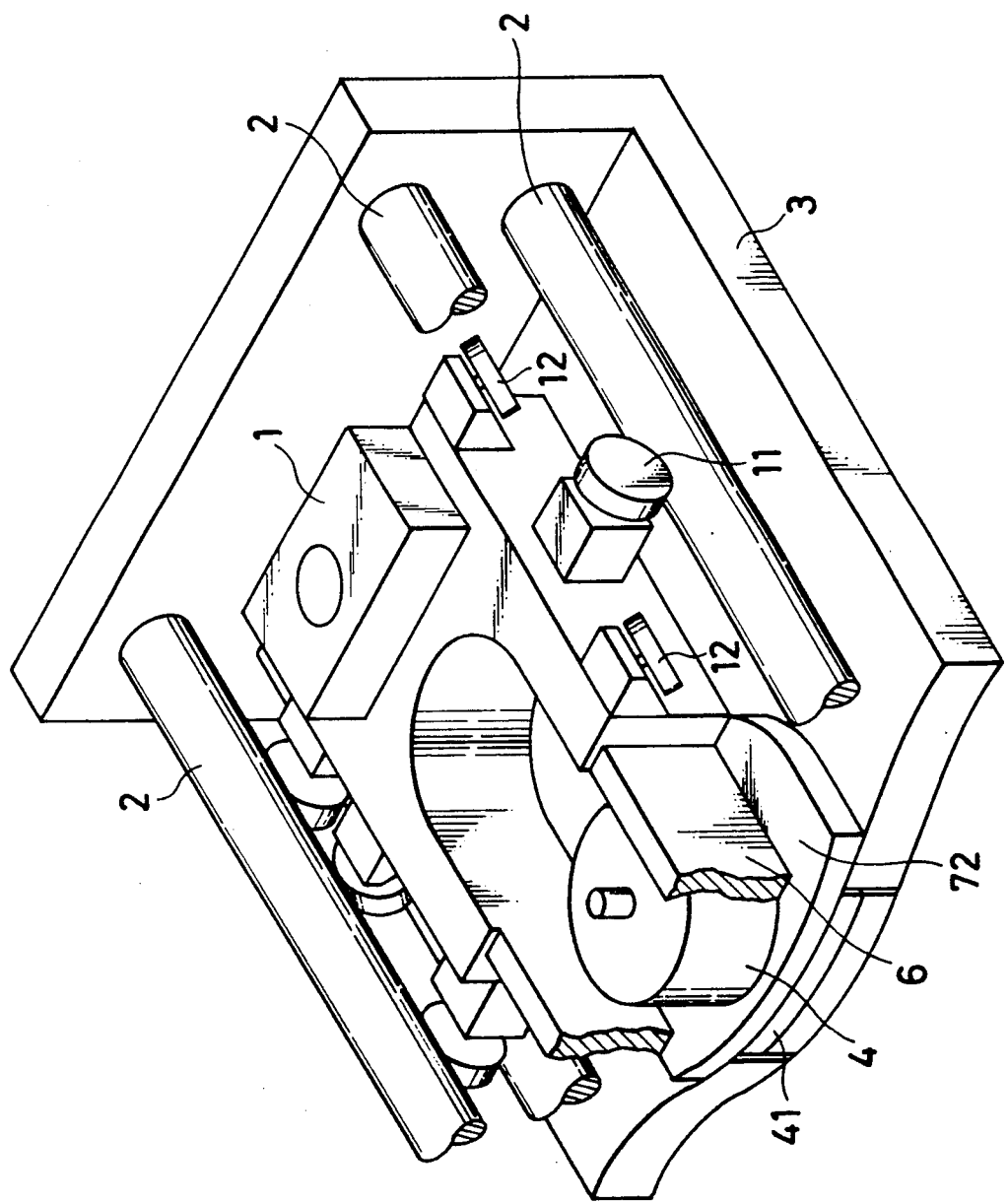
FIG. 6 is a partial perspective view showing the engagement of the optical head with guide rails, and the spindle, an upper part of the spindle being omitted.
Figure 7:
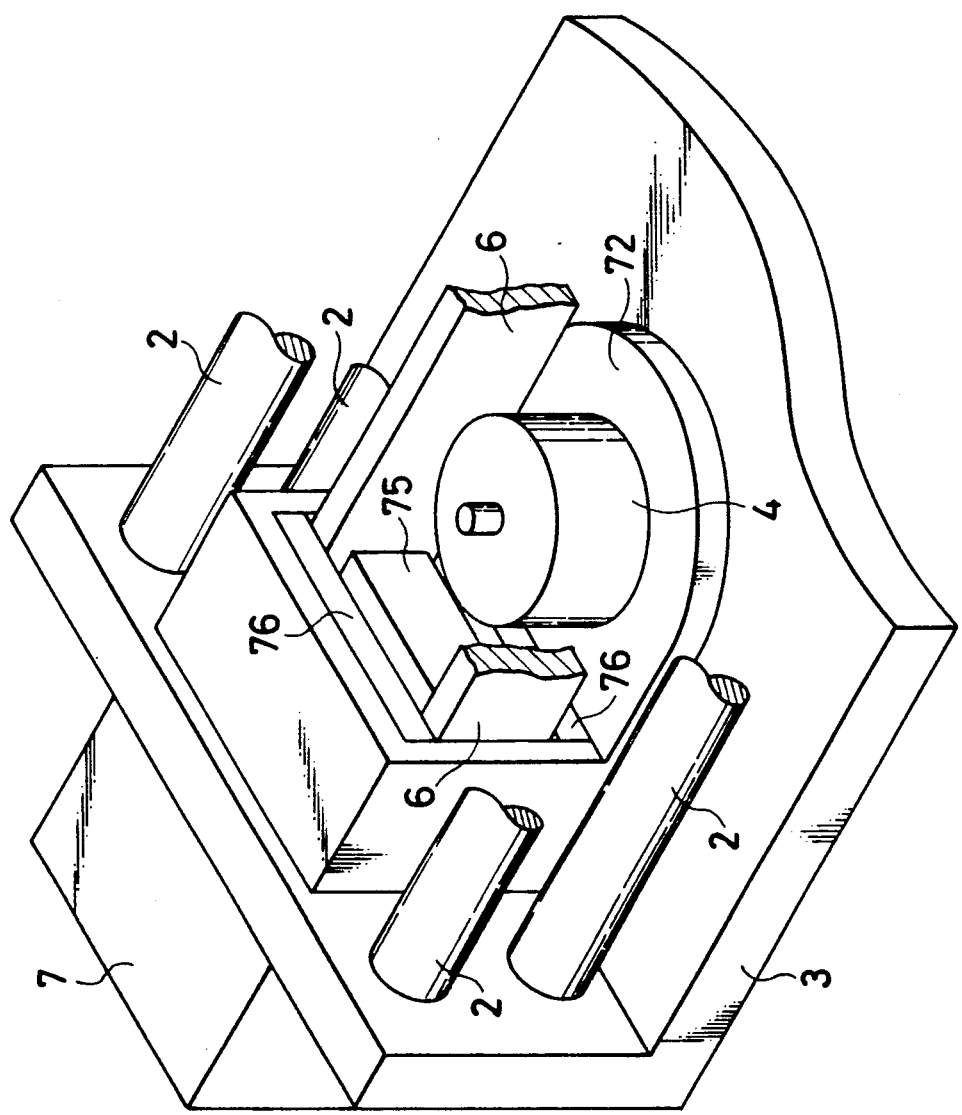
FIG. 7 is a partial perspective view showing the connection between the spindle and the magnetic circuit, an upper part of the spindle being omitted.
Figure 8:
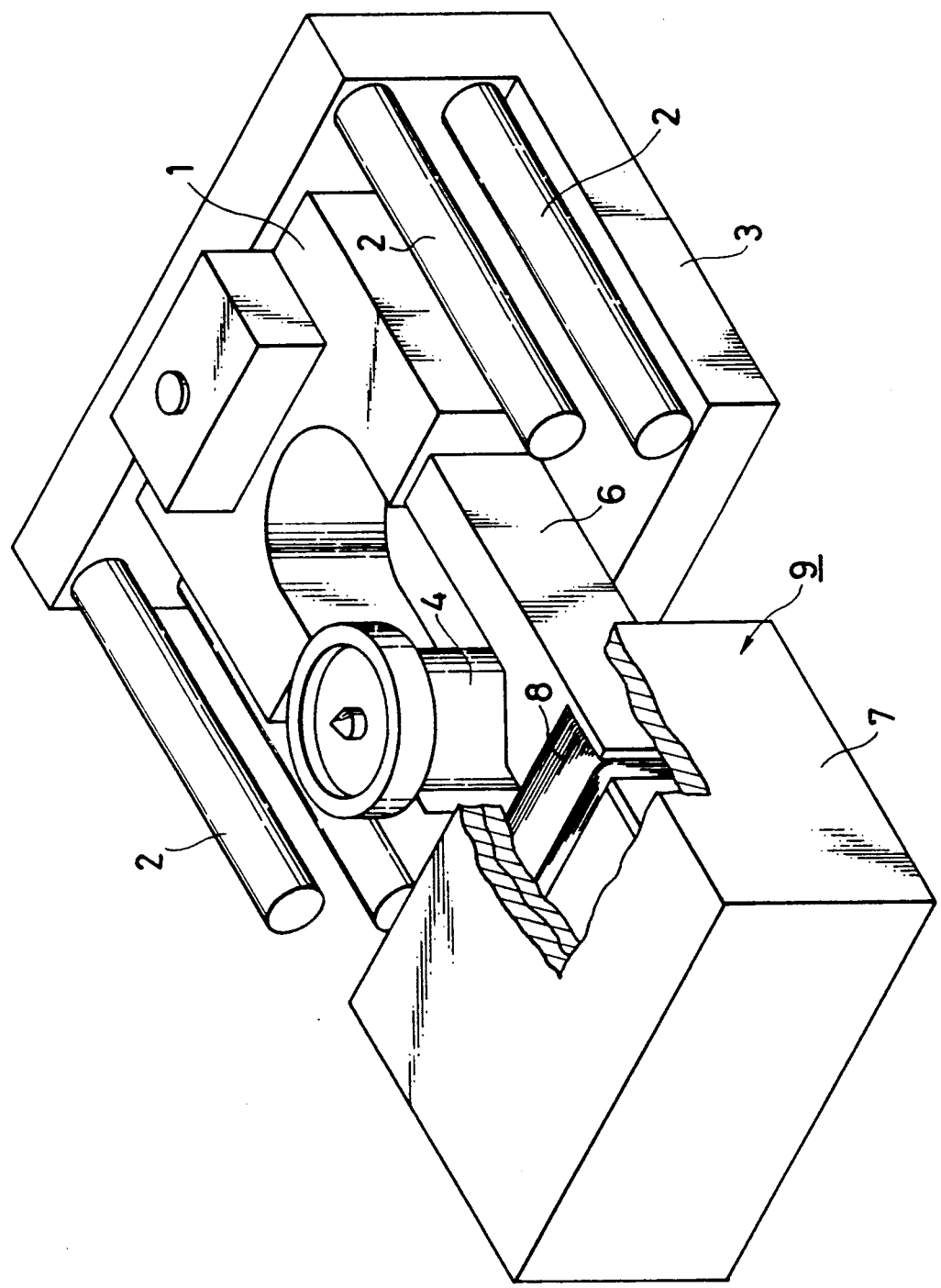
FIG. 8 is a partial perspective view of the optical head driving device, a part of guide rails and rollers being omitted.

Next, FIGS. 2 to 8 show another embodiment of the present invention. In the embodiment of FIGS. 2 to 8, a base 3 includes a vertical portion, the guide rails 2 are provided between the opposed vertical portions of the base 3, with both ends of respective guide rails being fixed to the vertical portions of the base, in parallel to the tracking direction of the optical head 1 (FIG. 8). The above mentioned structure of the vertical portion of the base and guide rails in the embodiments of FIGS. 2 to 8 differs from the FIG. 1 embodiment. Other constructure of the FIG. 2 embodiment is identical to the FIG. 1 embodiment.

In FIGS. 3, 4 and 6, the guide rails paired are located at upper and lower positions in a vertical direction.

In FIGS. 3, 4 and 6, two pairs of the guide rails are arranged in parallel to the tracking direction of the optical head 1, in the optical head driving device.

One pair of the guide rails are fixed to the vertical portions of the base 3 on one side of the optical head 1, while another pair of the guide rails are fixed to the vertical portions of the base 3 on the other side of the optical head 1.

Between the upper and the lower guide rails, the rollers of the optical head are arranged so that the rollers can be moved accurately in the tracking direction of the optical head 1.

Three rollers 11 with horizontal axes of rotation and three rollers 12 with inclined axes of rotation which are downwardly oriented at 45 degrees against a horizontal plane are provided alternately around the optical head 1.

Two of the rollers with horizontal axes of rotation 11 are provided at the front and rear corners on one side of the optical head 1, whereas two of the rollers 12 with the inclined axes of rotation are provided at the front and rear corners on the other side of the optical head 1. The remaining one roller with the inclined axis of rotation is provided between the two rollers 12 with horizontal axes of rotation on one side of the optical head 1 and the remaining one roller 11 with the horizontal axis of rotation is provided between the two rollers 12 with the inclined axes of rotation on the other side of the optical head 1.

Two of the rollers 11 with horizontal axes of rotation are in contact with the upper surface of the lower guide rails 2 between the upper and the lower guide rails on the left side of the optical head 1, whereas the other roller 11 with horizontal axis of rotation is in contact with the upper surface of the lower guide rails 2 between the upper and the lower guide rails on the right side of the optical head 1 (FIG. 4). One of the rollers 12 with the inclined axes of rotation is in contact with the lower right surface of the upper guide rails 2 on the left side of the optical head 1 (FIG. 4), whereas two of the rollers 12 with the inclined axes of rotation are in contact with the lower left surface of the upper guide rails 2 on the right side of the optical head 1 (FIG. 4).

As mentioned above, in the present embodiment, since two of the rollers 11 with horizontal axes of rotation and two of the rollers 12 with the inclined axes of rotation are provided at four corners of the optical head 1 and the remaining one roller with horizontal axis of rotation and the remaining one roller 11 with the inclined axis of rotation are provided between the above two rollers 12 with the inclined axes of rotation 12 and between the above two rollers 11 with horizontal axes of rotation, respectively, the optical head 1 can be stably and smoothly moved along the guide rails 2.

In FIGS. 5 and 7, one side yoke 71 of the magnetic circuit 7 has the length longer than the length of each of another side yoke 74, a center yoke 75 and a magnet 76 which form the magnetic circuit. The side yoke 71 has a side yoke extending portion 72. The side yoke extending portion 72 has a hole or a hole with notch, in which the spindle 4 is inserted and fixed to the side yoke extending poriton 72 by fixing the flange 41 to the side yoke 71, by which the spindle 41 and the magnetic circuit 7 of the voice coil motor are arranged closely to each other.

Figure 9:
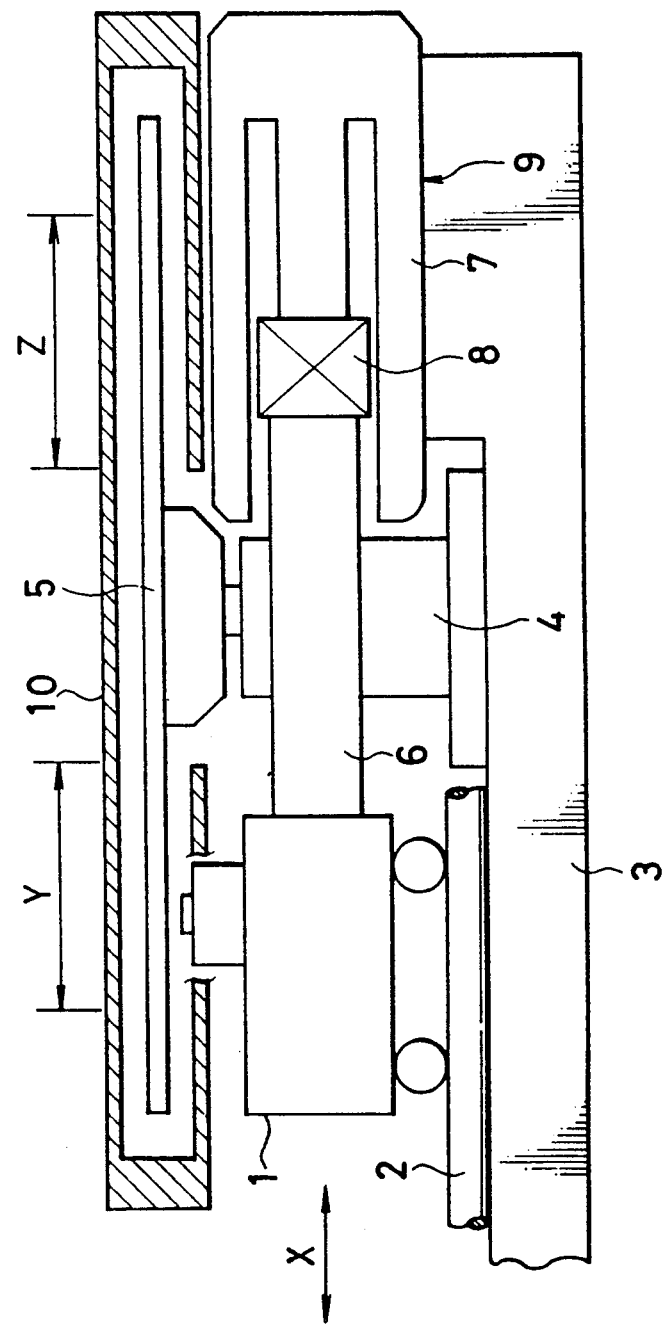
FIG. 9 is a schematic side view containing a part of section showing further embodiment of the present invention.

Next, FIG. 9 shows further embodiment of the present invention. In the FIG. 9 embodiment, a spindle 4 is supported by a base 3 as opposed to the FIG. 1. Other structure of the FIG. 9 embodiment is identical to that of the FIG. 1 embodiment.

Referring to FIG. 9, the optical head driving device according to the present invention is comprised of a spindle 4 disposed on a base 3 for driving a recording medium dick 5, an optical head 1 and a voice coil motor 9 for driving the optical head 1.

The optical head 1 is supported movably on the base 3 through a guide rail 2 in the tracking direction as indicated by arrow X in the figure, and moved along the recording medium 5 mounted on the spindle 4 so as to effect recording, reading out and erasing of information with respect to the recording medium 5.

Further, the optical head 1 is connected through a force transmitting arm to a coil 8 disposed and inserted into a cavity of a magnetic circuit 7 which is connected to the base in opposed relation to the optical head 1 with respect to the spindle 4, and is driven by force generated by the voice coil motor 9 comprised of the magnetic circuit 7 and the coil 8.

The spindle 4 is fixed to the base 3 or to the magnetic circuit 7. Further, the disk 5 is used in the form packed into a cartridge 10 if desired.

As a result, the driving force of the voice coil motor 9 is generated such that the center of gravity of the optical head 1 is accurately aligned in the tracking direction, i.e., moving direction thereof, and is transmitted to the optical head 1 through the force transmitting arm 6 which has a column structure aligned with the action direction with respect to the driving force transmission. Further, a single pair of the coil 8 and magnetic circuit 7 can be used and its assembly is easily carried out because the coil 8 can be inserted into the magnetic circuit 7 from one direction.

In addition, the optical head 1 travels within a predetermined zone having length smaller than the radius of the disk 5 as indicated, for example, by arrow Y in the figure. Therefore, coil 8 also requires the same travelling distance so that its travelling zone is set as indicated by arrow Z in the figure. By such arrangement, the voice coil motor 9 is constructed substantially within outer periphery of the recording medium 5 or the cartridge 10 thereof. Thus, the optical head 1, spindle 4 and voice coil motor 9 are assembled substantially within the outer periphery of the disk 5 or the cartridge 10 thereof.

Further, since the distance is short between the voice coil motor 9 which constitutes driving force generator and the spindle 4, there is obtained structual effect equivalent to increase of the rigidity of the base 3, thereby suppressing the vibration of spindle 4 relative to the optical head 1.

What is claimed is:

1. An optical head driving device, comprising:
   a spindle for driving a recording medium of disk shape;
   an optical head; and
   a voice coil motor for driving said optical head,
   said optical head being provided on a side of said spindle in opposed relation to said voice coil motor with respect to said spindle, and
   said optical head and said voice coil motor being coupled to each other through a force transmitting arm.

2. An optical head driving device as claimed in claim 1, wherein a guide rail is provided on said base for guiding said optical head, and said optical head is movably supported on said base through said guide rail.

3. An optical head driving device as claimed in claim 1, wherein said recording medium of disk shape is stored in a cartridge.

4. An optical head driving device as claimed in claim 1, wherein most of said voice coil motor is disposed within an outer periphery of said recording medium of disk shape.

5. An optical head driving device as claimed in claim 1, wherein most of said voice coil motor is disposed within an outer periphery of said cartridge of said recording medium of disk shape.

6. An optical head driving device as claimed in claim 1,
   wherein said device further comprises a base,
   wherein said voice coil motor comprises a coil and a magnetic circuit, said magnetic circuit having a side yoke and a side yoke extending portion, and
   wherein said spindle is fixed to said side yoke and said side yoke extending portion.

7. An optical head driving device a claimed in claims 1, 2 or 5, wherein said voice coil motor drives said optical head with a driving force, said driving force acts on the center of gravity of said optical head via said force transmitting arm.

8. An optical head driving device, comprising:
   a base;
   a guide rail disposed on said base;
   a spindle for mounting and rotating a recording medium of disk shape on a top portion of said spindle;
   a magnetic circuit including a side yoke disposed at a first side of said spindle, said magnetic circuit being fixed to said base and having an extension portion thereof for supporting a bottom portion of said spindle;
   a coil disposed and inserted into a gap of said magnetic circuit;
   an optical head provided on a second side of said spindle in opposed relation to said coil with respect to said spindle and engaged with said guide rail disposed on said base in parallel to said recording medium of disk shape for carrying out recording, reading out or erasing of information with respect to said recording medium of disk shape; and
   a force transmitting arm, having said optical head fixed at one end of said force transmitting arm and said coil fixed at the other end of said forced transmitting arm, for supporting said optical head and for transmitting a driving force from said coil to said optical head.

9. An optical head driving device as claimed in claim 8; wherein said recording medium of disk shape is stored in a cartridge.

10. An optical head driving device as claimed in claim 8 or 9, wherein most of said voice coil motor is disposed within an outer periphery of said recording medium of disk shape.

11. An optical head driving device as claimed in claim 8 or 9, wherein most of said voice coil motor is disposed within an outer periphery of said recording medium of disk shape.

12. An optical head driving device as claimed in claim 8, wherein said driving force acts on the center of gravity of said optical head via said force transmitting arm.

13. An optical head driving device, comprising:
   a base;
   a guide rail disposed on said base;
   a spindle mounting at a top face thereof a recording medium of disk shape and for rotating said recording medium;
   a magnetic circuit, including a side yoke, disposed to a first side of said spindle, said magnetic circuit being fixed to said base and having an extension portion thereof for supporting a bottom portion thereof for supporting a bottom portion of said spindle;
   a coil disposed and inserted into a gap of said magnetic circuit;
   an optical head, provided on a second side of said spindle in opposed relation to said coil with respect to said spindle and engaged with said guide rail disposed on said base in parallel to said recording medium, for reading out or erasing of information contained in said recording medium of disk shape, and a force transmitting arm for fixing and supporting, at opposite end portions thereof, said coil and said optical head,
   wherein said base includes opposed vertical portions to which upper and lower guide rails are fixed in pairs on both sides of the optical head, said optical head includes rollers with horizontal axes of rotation and rollers with inclined axes of rotation being downwardly oriented, said rollers with horizontal axes of rotation and said rollers with inclined axes of rotation being provided alternately around said optical head, said rollers with horizontal axes of rotation being in contact with an upper surface of said lower guide rails between the pairs of said guide rails, and said rollers with inclined axes of rotation being in contact with a lower oblique surface of said upper guide rails.

14. An optical head driving device as claimed im claim 13, wherein two of the rollers with horizontal axes of rotation are provided at front and rear corners on one side of said optical head, and wherein two of said rollers with the inclined axes of rotation being provided at front and rear corners on the other side of said optical head, and the remaining roller with the inclined axis of rotation is provided between the two rollers with horizontal axes of rotation on one side of said optical head, and the remaining roller with the horizontal axis of rotation is provided between the two rollers with the inclined axes of rotation on the other side of said optical head.

* * * * *